(12) United States Patent
Naruse

(10) Patent No.: US 12,447,777 B2
(45) Date of Patent: Oct. 21, 2025

(54) PNEUMATIC TIRE

(71) Applicant: The Yokohama Rubber Co., LTD., Kanagawa (JP)

(72) Inventor: Masahiro Naruse, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/960,057

(22) Filed: Nov. 26, 2024

(65) Prior Publication Data

US 2025/0083478 A1   Mar. 13, 2025

Related U.S. Application Data

(62) Division of application No. 17/904,068, filed as application No. PCT/JP2021/005236 on Feb. 12, 2021.

(30) Foreign Application Priority Data

| Feb. 17, 2020 | (JP) | 2020-024289 |
| Feb. 17, 2020 | (JP) | 2020-024290 |
| Feb. 17, 2020 | (JP) | 2020-024291 |

(51) Int. Cl.
*B60C 19/00*  (2006.01)
*B60C 15/06*  (2006.01)

(52) U.S. Cl.
CPC ............ *B60C 19/00* (2013.01); *B60C 15/06* (2013.01); *B60C 2015/0678* (2013.01); *B60C 2019/004* (2013.01)

(58) Field of Classification Search
CPC .............. B60C 19/00; B60C 2019/004; B60C 23/0433; B60C 23/0493; G06K 19/07764
See application file for complete search history.

(56) References Cited

U.S. PATENT DOCUMENTS

| 2001/0020507 | A1 | 9/2001 | Pereira et al. |
| 2011/0259497 | A1 | 10/2011 | Borot et al. |
| 2013/0112324 | A1 | 5/2013 | Battocchio |
| 2014/0333492 | A1 | 11/2014 | Battocchio |
| 2017/0368874 | A1 | 12/2017 | Blanis |
| 2019/0084357 | A1 | 3/2019 | Guicherd et al. |
| 2019/0322142 | A1 | 10/2019 | Lallement et al. |

(Continued)

FOREIGN PATENT DOCUMENTS

| CN | 1100727113 A | 7/2019 |
| FR | 3059605 A1 | 6/2018 |

(Continued)

*Primary Examiner* — Robert C Dye
(74) *Attorney, Agent, or Firm* — Thorpe North & Western

(57) ABSTRACT

A pneumatic tire includes: a tread portion extending in a tire circumferential direction and having an annular shape; a pair of sidewall portions disposed on both sides of the tread portion; and a pair of bead portions disposed on an inner side in a tire radial direction of the sidewall portions. The tire is embedded with a transponder covered with a covering layer. A modulus M50 (0° C.) at 50% deformation at 0° C. of the covering layer is in a range of from 0.5 MPa to 2.0 MPa, and a modulus M50 (−20° C.) at 50% deformation at −20° C. of the covering layer and the modulus M50 (0° C.) at 50% deformation at 0° C. of the covering layer satisfy a relationship 1.0<M50 (−20° C.)/M50 (0° C.)≤2.5.

11 Claims, 6 Drawing Sheets

(56) References Cited

U.S. PATENT DOCUMENTS

| | | | |
|---|---|---|---|
| 2019/0375926 A1* | 12/2019 | Pavageau | ............... C08L 33/068 |
| 2020/0079159 A1 | 3/2020 | Destraves | |
| 2020/0384811 A1 | 12/2020 | Hicks et al. | |

FOREIGN PATENT DOCUMENTS

| | | | | |
|---|---|---|---|---|
| JP | H07-137510 A | 5/1995 | | |
| JP | 2001-525281 A | 12/2001 | | |
| JP | 2007-230261 A | 9/2007 | | |
| JP | 2008-296552 A | 12/2008 | | |
| JP | 2010-264627 A | 11/2010 | | |
| JP | 2016-007749 A | 1/2016 | | |
| JP | 2016-37235 A | 3/2016 | | |
| JP | 6529702 B1 | 6/2019 | | |
| JP | 6582105 B1 | 9/2019 | | |
| JP | 6549504 B1 | 10/2019 | | |
| JP | 6594504 B1 | 10/2019 | | |
| KR | 10-2010-0120505 A | 11/2010 | | |
| WO | WO-9929522 A1 * | 6/1999 | ........... H01Q 1/2241 | |
| WO | WO 2007/100111 A1 | 9/2007 | | |
| WO | WO 2019/180357 A1 | 9/2019 | | |

* cited by examiner

PNEUMATIC TIRE

RELATED APPLICATIONS

This application is a divisional of U.S. patent application Ser. No. 17/904,068 filed on Aug. 11, 2022, which claims priority to International Patent Application No. PCT/JP2021/005236 filed on Feb. 12, 2021, which claims the benefit of Japanese Patent Application Nos. 2020-024289, 2020-024290 and 2020-024291 each filed on Feb. 17, 2020, all of which are incorporated herein by reference.

TECHNICAL FIELD

The present technology relates to a pneumatic tire in which a transponder covered with a covering layer is embedded and particularly relates to a pneumatic tire that can provide improved transponder durability while ensuring tire durability.

BACKGROUND ART

For pneumatic tires, embedment of an RFID (radio frequency identification) tag (transponder) in a tire has been proposed (see, for example, Japan Unexamined Patent Publication No. H07-137510). In the case where a transponder is embedded in the tire, the durability of the tire or the transponder cannot be sufficiently ensured if the physical properties of the covering layer for protecting the transponder are inadequate. That is, in a case where the elastic modulus of the covering layer is too low, its protective effect on the transponder is impaired, and in a case where the elastic modulus of the covering layer is too high, stress concentration is generated at or near an edge of the covering layer, causing damage to the tire.

Further, in a case where the temperature dependency of the modulus of the covering layer in a low temperature range is too small, stress concentration is generated at or near the edge of the covering layer with a rise in tire temperature during travel in a low-temperature environment, peeling is likely to occur between the covering layer and a peripherally located member, and the tire tends to be damaged. Also, in a case where the temperature dependency of the modulus of the covering layer in a low temperature range is too large, the covering layer softens with a rise in tire temperature during travel in a low-temperature environment, and its protective effect on the transponder is impaired.

Further, in a case where the temperature dependency of the modulus of the covering layer in a normal to high temperature range is too small, stress concentration is generated at or near the edge of the covering layer at high temperature, peeling is likely to occur between the covering layer and a peripherally located member, and the tire tends to be damaged. Also, in a case where the temperature dependency of the modulus of the covering layer in a normal to high temperature range is too large, the covering layer softens at high temperature, and its protective effect on the transponder is impaired.

SUMMARY

The present technology provides a pneumatic tire that can provide improved transponder durability while ensuring tire durability.

A pneumatic tire according to a first embodiment includes: a tread portion extending in a tire circumferential direction and having an annular shape; a pair of sidewall portions disposed on both sides of the tread portion; and a pair of bead portions disposed on an inner side in a tire radial direction of the sidewall portions. The tire is embedded with a transponder covered with a covering layer. The secant modulus of elasticity at 10% deformation at 20° C. of the covering layer is in a range of from 0.5 MPa to 5.0 MPa.

A pneumatic tire according to a second embodiment: a tread portion extending in a tire circumferential direction and having an annular shape; a pair of sidewall portions disposed on both sides of the tread portion; and a pair of bead portions disposed on an inner side in a tire radial direction of the sidewall portions. The tire is embedded with a transponder covered with a covering layer. The modulus M50 (0° C.) at 50% deformation at 0° C. of the covering layer is in a range of from 0.5 MPa to 2.0 MPa. The modulus M50 (−20° C.) at 50% deformation at −20° C. of the covering layer and the modulus M50 (0° C.) at 50% deformation at 0° C. of the covering layer satisfy a relationship $1.0 < M50\ (-20°\ C.)/M50\ (0°\ C.) \leq 2.5$.

A pneumatic tire according to a third embodiment includes: a tread portion extending in a tire circumferential direction and having an annular shape; a pair of sidewall portions disposed on both sides of the tread portion; and a pair of bead portions disposed on an inner side in a tire radial direction of the sidewall portions. The tire is embedded with a transponder covered with a covering layer. The modulus M50 (20° C.) at 50% deformation at 20° C. is in a range of from 0.4 MPa to 1.5 MPa. The modulus M50 (20° C.) at 50% deformation at 20° C. of the covering layer and a modulus M50 (100° C.) at 50% deformation at 100° C. of the covering layer satisfy a relationship $1.0 < M50\ (20°\ C.)/M50\ (100°\ C.) \leq 2.5$.

In the first embodiment, the transponder is covered with the covering layer and the secant modulus of elasticity at 10% deformation at 20° C. of the covering layer is set in the range described above. Thus, the covering layer can exert a sufficient protective effect on the transponder while avoiding stress concentration at or near the edge of the covering layer. This can improve the durability of the transponder while ensuring the durability of the tire.

In the second embodiment, the transponder is covered with the covering layer and the modulus M50 (0° C.) at 50% deformation at 0° C. of the covering layer is set in the range described above, and the modulus M50 (−20° C.) at 50% deformation at −20° C. of the covering layer and the modulus M50 (0° C.) at 50% deformation at 0° C. of the covering layer satisfy the relationship described above. Thus, the covering layer can exert a sufficient protective effect on the transponder while avoiding stress concentration at or near the edge of the covering layer during a rise in tire temperature in a low-temperature environment. This can improve the durability of the transponder while ensuring the durability of the tire.

In the third embodiment, the transponder is covered with the covering layer and the modulus M50 (20° C.) at 50% deformation at 20° C. of the covering layer is set in the range described above, and the modulus M50 (20° C.) at 50% deformation at 20° C. of the covering layer and the modulus M50 (100° C.) at 50% deformation at 100° C. of the covering layer satisfy the relationship described above. Thus, the covering layer can exert a sufficient protective effect on the transponder at high temperature while avoiding stress concentration at or near the edge of the covering layer at high temperature. This can improve the durability of the transponder while ensuring the durability of the tire.

In the pneumatic tire according to the first or third embodiments, a storage modulus E'c (20° C.) at 20° C. of the covering layer is preferably in a range of from 2 MPa to 12 MPa. This can effectively improve the durability of the transponder while ensuring the durability of the tire.

In the pneumatic tire according to the first or third embodiments, preferably, the transponder is embedded on an outer side in a tire width direction of the carcass layer, and a storage modulus E'c (20° C.) at 20° C. of the covering layer and a storage modulus E'out (20° C.) at 20° C. of a rubber member having a largest storage modulus at 20° C. of rubber members located on the outer side in the tire width direction of the transponder satisfy a relationship 0.1≤E'c (20° C.)/E'out (20° C.)≤1.5. This can effectively improve the durability of the transponder while ensuring the durability of the tire.

In the pneumatic tire according to the second embodiment, a storage modulus E'c (−20° C.) at −20° C. of the covering layer is preferably in a range of from 3 MPa to 17 MPa. This can effectively improve the durability of the transponder in a low-temperature environment while ensuring the durability of the tire.

In the pneumatic tire according to the second embodiment, preferably, the transponder is embedded on an outer side in a tire width direction of the carcass layer, and a storage modulus E'c (−20° C.) at −20° C. of the covering layer and a storage modulus E'out (−20° C.) at −20° C. of a rubber member having a largest storage modulus at 20° C. of rubber members located on the outer side in the tire width direction of the transponder satisfy a relationship 0.1≤E'c (−20° C.)/E'out (−20° C.)≤1.5. This can effectively improve the durability of the transponder in a low-temperature environment while ensuring the durability of the tire.

In the pneumatic tire according to the first, second or third embodiments, the covering layer preferably has a relative dielectric constant of 7 or less. This can ensure the radio wave transmissivity of the transponder and improve the communication performance of the transponder.

The covering layer is preferably formed of a rubber or an elastomer and 20 phr or more of a white filler. This can lower the relative dielectric constant of the covering layer and effectively improve the communication performance of the transponder.

The white filler preferably includes from 20 phr to 55 phr of calcium carbonate. This can lower the relative dielectric constant of the covering layer and effectively improve the communication performance of the transponder.

A center of the transponder is preferably disposed 10 mm or more away in the tire circumferential direction from a splice portion of a tire component. This can effectively improve the durability of the tire.

The transponder is preferably disposed between a position 15 mm away from and on an outer side in the tire radial direction of an upper end of a bead core of the bead portion and a tire maximum width position. Accordingly, the transponder is disposed in a region where the stress amplitude during travel is small. This can effectively improve the durability of the transponder, and does not degrade the durability of the tire.

A distance between a cross-sectional center of the transponder and a tire surface is preferably 1 mm or more. This can effectively improve the durability of the tire as well as improve the scratch resistance of the tire.

A thickness of the covering layer preferably ranges from 0.5 mm to 3.0 mm. This can effectively improve the communication performance of the transponder without making the tire surface uneven.

Preferably, the transponder includes an IC (integrated circuit) substrate that stores data and an antenna that transmits and receives data, and the antenna has a helical shape. This allows the transponder to follow deformation of the tire during travel, improving the durability of the transponder.

In the first, second or third embodiments, the secant modulus of elasticity at 10% deformation is calculated based on a stress-elongation curve measured at a designated temperature and a tensile speed of 500 mm/min using a No. 3 three-dimensional dumbbell-shaped test piece in accordance with JIS (Japanese Industrial Standard)-K6251. The modulus at 50% deformation is a tensile stress at 50% elongation, the tensile stress being measured at a designated temperature and a tensile speed of 500 mm/min using a No. 3 dumbbell-shaped test piece in accordance with JIS-K6251. However, in a case where a No. 3 three-dimensional dumbbell-shaped test piece cannot be collected from the tire, a test piece having a different shape may be used. The storage modulus E' is measured at a designated temperature, a frequency of 10 Hz, an initial strain of 10%, and a dynamic distortion of ±2% using a viscoelasticity spectrometer in a tensile deformation mode in accordance with JIS-K6394.

DETAILED DESCRIPTION

A configuration according to a first embodiment will be described in detail below with reference to the accompanying drawings. FIGS. 1 to 4 illustrate a pneumatic tire according to an embodiment of the present technology.

Figure 1:
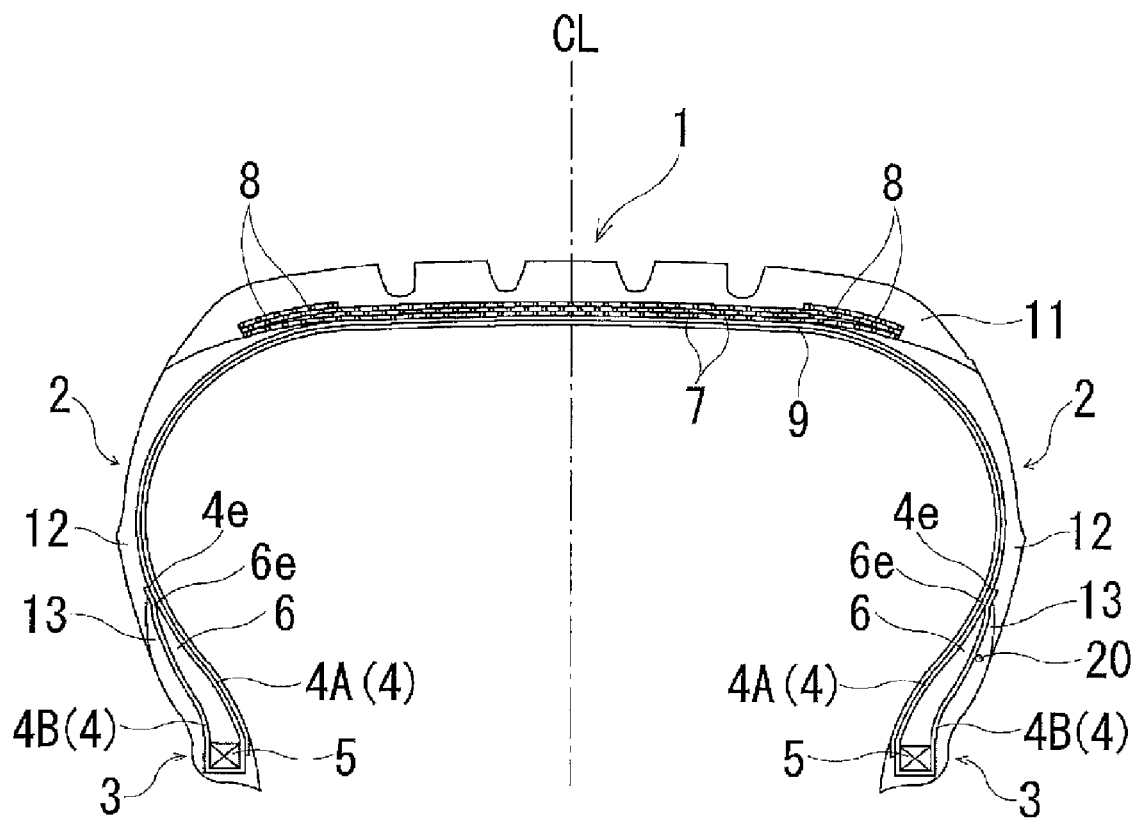
FIG. 1 is a meridian semi-cross-sectional view illustrating a pneumatic tire according to an embodiment of the present technology.
Figure 2:
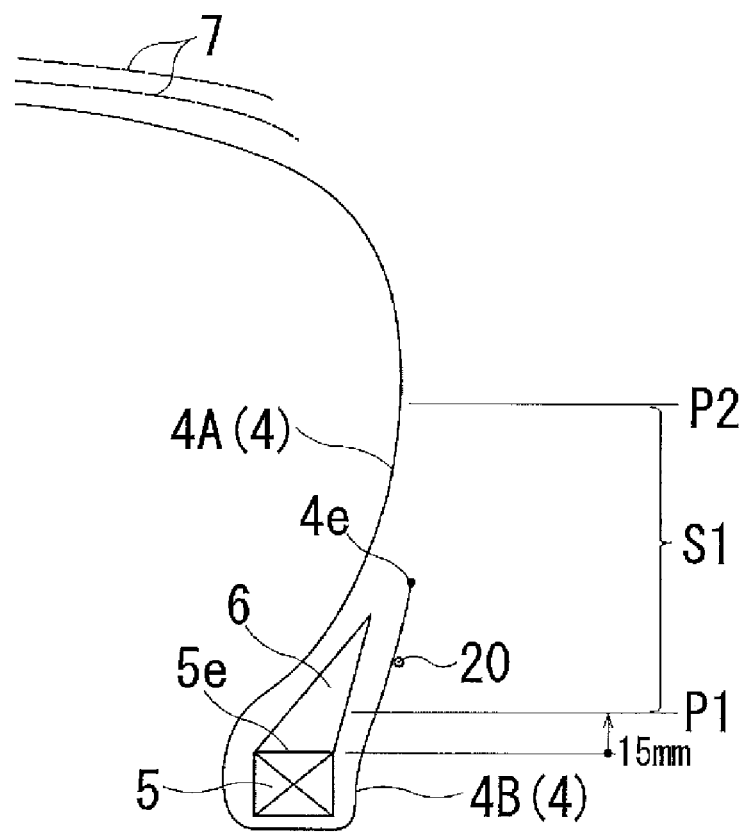
FIG. 2 is a meridian cross-sectional view schematically illustrating the pneumatic tire of FIG. 1.

As illustrated in FIG. 1, the pneumatic tire according to the present embodiment includes a tread portion 1 extending in a tire circumferential direction and having an annular shape, a pair of sidewall portions 2 disposed on both sides of the tread portion 1, and a pair of bead portions 3 disposed on an inner side in a tire radial direction of the pair of sidewall portions 2.

At least one carcass layer 4 (one layer in FIG. 1) formed by arraying a plurality of carcass cords in a radial direction is mounted between the pair of bead portions 3. The carcass layer 4 is covered with rubber. The carcass cords forming the carcass layer 4 are preferably organic fiber cords of nylon, polyester, or the like. The bead portions 3 are each embedded with a bead core 5 having an annular shape, and a bead filler 6 made of a rubber composition and having a triangular cross-section is disposed on an outer circumference of the bead core 5.

On the other hand, a plurality of belt layers 7 (two layers in FIG. 1) are embedded on a tire outer circumferential side of the carcass layer 4 of the tread portion 1. The belt layers 7 include a plurality of reinforcing cords that are inclined with respect to the tire circumferential direction, and the reinforcing cords intersect each other between the layers. In the belt layers 7, the inclination angle of the reinforcing cords with respect to the tire circumferential direction is set in a range of, for example, from 10° to 40°. The reinforcing cords of the belt layers 7 are preferably steel cords.

To improve high-speed durability, at least one belt cover layer 8 (two layers in FIG. 1) formed by arraying reinforcing cords at an angle of, for example, 5° or less with respect to the tire circumferential direction is disposed on the tire outer circumferential side of the belt layers 7. In FIG. 1, the belt cover layer 8 located on the inner side in the tire radial direction forms a full cover that covers the entire width of the belt layers 7, and the belt cover layer 8 located on an outer side in the tire radial direction forms an edge cover layer that covers only end portions of the belt layers 7. The reinforcing cords of the belt cover layer 8 are preferably organic filament cords of nylon, aramid, or the like.

In the pneumatic tire described above, both ends 4e of the carcass layer 4 are each folded back from a tire inner side to a tire outer side around the bead core 5, wrapping around the bead core 5 and the bead filler 6. The carcass layer 4 includes: a body portion 4A corresponding to a portion extending from the tread portion 1 through each of the sidewall portions 2 to each of the bead portions 3; and a turned up portion 4B corresponding to a portion turned up around the bead core 5 at each of the bead portions 3 and extending toward a sidewall portion 2 side.

A tire inner surface includes an innerliner layer 9 disposed along the carcass layer 4. The tread portion 1 includes a cap tread rubber layer 11, the sidewall portion 2 includes a sidewall rubber layer 12, and the bead portion 3 includes a rim cushion rubber layer 13.

Figure 4:
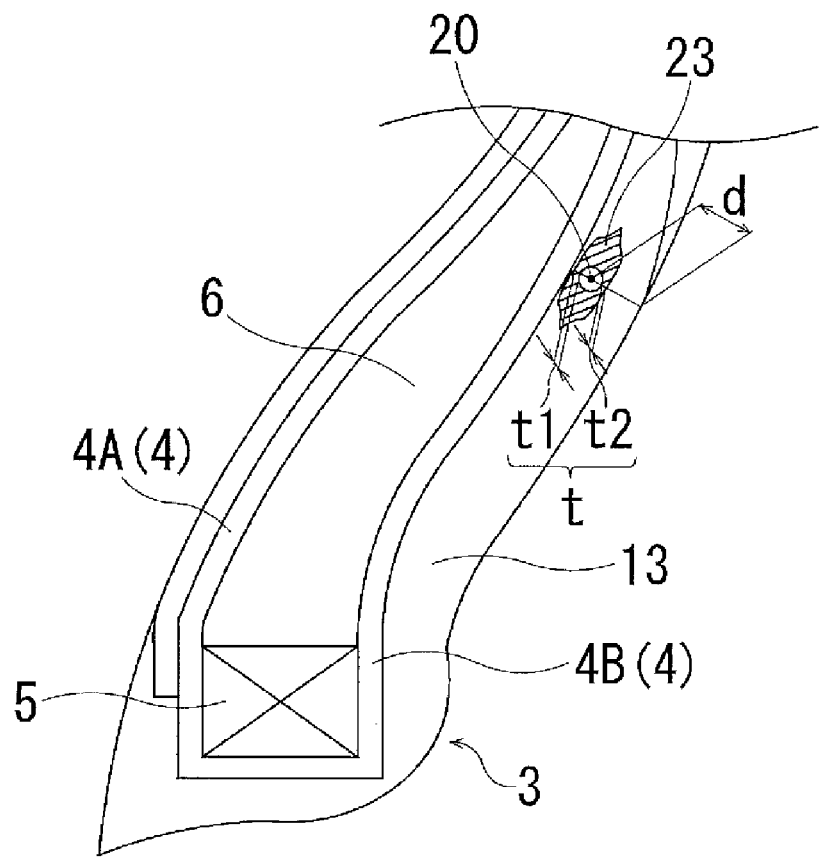
FIG. 4 is an enlarged cross-sectional view illustrating a transponder embedded in the pneumatic tire of FIG. 1.

The pneumatic tire described above includes a transponder 20 embedded in a portion on an outer side in a tire width direction of the carcass layer 4. The transponder 20 extends along the tire circumferential direction. The transponder 20 may be inclined at an angle in a range of from −10° to 10° with respect to the tire circumferential direction. As illustrated in FIG. 4, the transponder 20 is covered with a covering layer 23. The covering layer 23 covers the transponder 20 completely so as to sandwich both front and rear surfaces of the transponder 20. The covering layer 23 may be formed from a rubber having physical properties identical to those of a rubber forming the sidewall rubber layer 12 or the rim cushion rubber layer 13, or may be formed from a rubber having different physical properties.

Figure 5A:
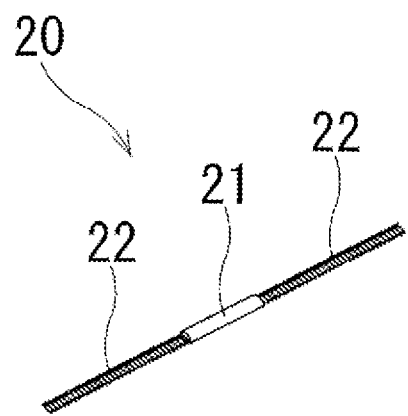
FIGS. 5A and 5B are perspective views each illustrating a transponder that can be embedded in a pneumatic tire according to an embodiment of the present technology.
Figure 5B:
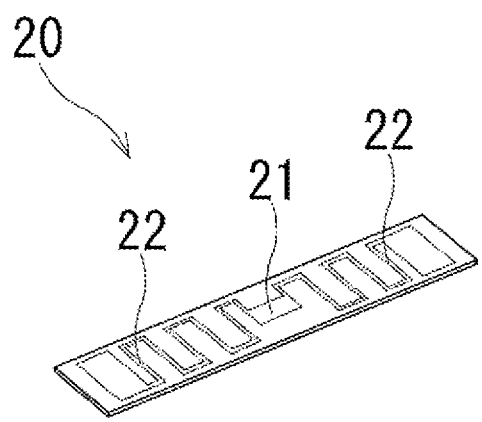

The transponder 20 may be, for example, a radio frequency identification (RFID) tag. As illustrated in FIGS. 5A and 5B, the transponder 20 includes an IC substrate 21 for storing data and an antenna 22 for transmitting and receiving data in a non-contact manner. The transponder 20 as described above can be used to write or read information related to the tire on a timely basis and to efficiently manage the tire. Note that "RFID" refers to an automatic recognition technology formed of a reader/writer including an antenna and a controller and of an ID tag including an IC substrate and an antenna, the automatic recognition technology allowing data to be communicated in a wireless manner.

The overall shape of the transponder 20 is not particularly limited, and can be, for example, a pillar-like shape or plate-like shape as illustrated in FIGS. 5A and 5B. In particular, the transponder 20 having a pillar-like shape as illustrated in FIG. 5A can follow deformation of the tire in various directions, and thus is suitable. In this case, the antenna 22 of the transponder 20 projects from each of both end portions of the IC substrate 21 and has a helical shape. This allows the transponder 20 to follow deformation of the tire during travel, improving the durability of the transponder 20. The length of the antenna 22 can be appropriately changed to ensure communication performance.

In the pneumatic tire thus configured, the secant modulus of elasticity at 10% deformation at 20° C. of the covering layer 23 covering the transponder 20 is set in the range of from 0.5 MPa to 5.0 MPa. In particular, the secant modulus of elasticity at 10% deformation at 20° C. of the covering layer 23 is preferably in the range of from 2.0 MPa to 4.0 MPa.

In the pneumatic tire described above, the transponder 20 is covered with the covering layer 23 and the secant modulus of elasticity at 10% deformation at 20° C. of the covering layer 23 is set in the range described above. Thus, the covering layer 23 can exert a sufficient protective effect on the transponder 20 while avoiding stress concentration at or near the edge of the covering layer 23. This can improve the durability of the transponder 20 while ensuring the durability of the tire.

Here, in a case where the secant modulus of elasticity at 10% deformation at 20° C. of the covering layer 23 is lower than the lower limit value, the covering layer 23 is too soft, and thus the covering layer 23 is compressed during tire deformation, and the transponder 20 is likely to be damaged. Conversely, in a case where the secant modulus of elasticity at 10% deformation at 20° C. of the covering layer 23 is higher than the upper limit value, stress concentration is generated at or near the edge of the covering layer 23 during tire deformation, and peeling is likely to occur at an interface between the covering layer 23 and a rubber member adjacent to the covering layer 23.

Further, in the pneumatic tire described above, the transponder 20 is embedded on the outer side in the tire width direction of the carcass layer 4, and thus there is no tire component blocking radio waves during communication with the transponder 20, and the communication performance of the transponder 20 can be favorably ensured. In a case where the transponder 20 is embedded on the outer side in the tire width direction of the carcass layer 4, the transponder 20 can be disposed between the turned up portion 4B of the carcass layer 4 and the rim cushion rubber layer 13, or between the carcass layer 4 and the sidewall rubber layer 12. In another configuration, the transponder 20 can be disposed between the turned up portion 4B of the carcass layer 4 and the bead filler 6, or between the main body portion 4A of the carcass layer 4 and the bead filler 6.

In the pneumatic tire described above, a storage modulus E'c (20° C.) at 20° C. of the covering layer 23 is preferably in a range of from 2 MPa to 12 MPa. By thus setting the physical properties of the covering layer 23, the durability of the transponder 20 can be effectively improved.

Here, in a case where the storage modulus E'c (20° C.) at 20° C. of the covering layer 23 is lower than the lower limit value, the rigidity of the covering layer 23 decreases, and the protective effect thereof degrades. Conversely, in a case where the storage modulus E'c (20° C.) at 20° C. of the covering layer 23 is higher than the upper limit value, the rigidity of the covering layer 23 increases, the covering layer 23 becomes brittle, and the covering layer 23 becomes prone to breakage, and thus the transponder 20 is likely to be damaged.

The storage modulus E'c (20° C.) at 20° C. of the covering layer 23 and the storage modulus E'c (60° C.) at 60° C. of the covering layer 23 preferably satisfy the relationship 1.0≤E'c (20° C.)/E'c (60° C.)≤1.5. By thus setting the physical properties of the covering layer 23, the temperature dependency of the covering layer 23 decreases (the covering layer 23 is less likely to generate heat), and this prevents the covering layer 23 from softening even with a rise in tire temperature during high-speed travel, effectively improving the durability of the transponder 20.

In the pneumatic tire described above, of the rubber members located on the outer side in the tire width direction of the transponder 20 (the sidewall rubber layer 12 and the rim cushion rubber layer 13 in FIG. 1), the rubber member having the largest storage modulus E'out (20° C.) at 20° C. (hereinafter sometimes referred to as an external member) corresponds to the rim cushion rubber layer 13. Note that the rubber member (external member) having the largest storage modulus at 20° C. does not include the covering layer 23 covering the transponder 20.

Further, in a structure in which the transponder 20 is embedded on the outer side in the tire width direction of the carcass layer 4, the storage modulus E'out (20° C.) at 20° C. of the external member and the storage modulus E'c (20° C.) at 20° C. of the covering layer 23 preferably satisfy the relationship 0.1≤E'c (20° C.)/E'out (20° C.)≤1.5. In particular, the relationship 0.15≤E'c (20° C.)/E'out (20° C.)≤1.30 is preferably satisfied. This can effectively improve the durability of the transponder 20 while ensuring the durability of the tire.

Here, in a case where the value of E'c (20° C.)/E'out (20° C.) is smaller than the lower limit value, the rigidity of the covering layer 23 decreases, and the protective effect thereof degrades. Conversely, in a case where the value of E'c (20° C.)/E'out (20° C.) is larger than the upper limit value, the rigidity of the covering layer 23 increases, the covering layer 23 becomes brittle, and the covering layer 23 becomes prone to breakage, and thus the transponder 20 is likely to be damaged.

The composition of the covering layer 23 is preferably a rubber or an elastomer and 20 phr or more of a white filler. Such a composition of the covering layer 23 can lower the relative dielectric constant of the covering layer 23, compared to a composition containing carbon, and effectively improve the communication performance of the transponder 20. Note that "phr" means weight parts per 100 parts by weight of a rubber component (elastomer).

The white filler forming the covering layer 23 preferably includes from 20 phr to 55 phr of calcium carbonate. This can lower the relative dielectric constant of the covering layer 23 and effectively improve the communication performance of the transponder 20. However, too much calcium carbonate in the white filler makes the covering layer 23 brittle and lowers its strength, and this is not preferable. The covering layer 23 can optionally include 20 phr or less of a silica (white filler) or 5 phr or less of a carbon black in addition to calcium carbonate. An addition of a small amount of silica and carbon black can lower the relative dielectric constant of the covering layer 23 while ensuring the strength thereof.

The covering layer 23 preferably has a relative dielectric constant of 7 or less, and more preferably of from 2 to 5. By thus setting the relative dielectric constant of the covering layer 23 as appropriate, the radio wave transmissivity of the transponder 20 during emission of radio waves can be ensured, and the communication performance of the transponder 20 can be effectively improved. Note that the rubber forming the covering layer 23 has a relative dielectric constant of from 860 MHz to 960 MHz at ambient temperature. Here, the ambient temperature is 23±2° C. and 60%±5% RH in accordance with the standard conditions of the JIS standard. The relative dielectric constant of the rubber is measured in accordance with an electrostatic capacitance method after a 24-hour treatment at 23° C. and 60% RH. The range from 860 MHz to 960 MHz described above corresponds to currently allocated frequencies of the RFID in a UHF (ultra high frequency) band, but in a case where the allocated frequencies are changed, it is only required that the relative dielectric constant in the range of the allocated frequencies be specified as described above.

A thickness t of the covering layer 23 is preferably from 0.5 mm to 3.0 mm, and more preferably from 1.0 mm to 2.5 mm. Here, the thickness t of the covering layer 23 is a rubber thickness at a position including the transponder 20, and is, for example, a rubber thickness obtained by summing a thickness t1 and a thickness t2 on a straight line extending through the center of the transponder 20 and intersecting a tire surface (tire outer surface in FIG. 4) at right angles as illustrated in FIG. 4. By thus setting the thickness t of the covering layer 23 as appropriate, the communication performance of the transponder 20 can be effectively improved without making the tire surface uneven. Here, the covering layer 23 having a thickness t of less than 0.5 mm will fail to yield an effect of improving the communication performance of the transponder 20, whereas the covering layer 23 having a thickness t exceeding 3.0 mm will make the tire surface uneven, and this is not preferable for appearance. Note that the cross-sectional shape of the covering layer 23 is not particularly limited and can be, for example, a triangular shape, a rectangular shape, a trapezoidal shape, or a spindle shape. The cross-sectional shape of the covering layer 23 of FIG. 4 is substantially spindle-shaped.

In the pneumatic tire described above, the transponder 20 is preferably disposed in a placement region in the tire radial direction between a position P1 15 mm away from and on the outer side in the tire radial direction of an upper end 5e (an end portion on the outer side in the tire radial direction) of the bead core 5 and a position P2 where the tire width is greatest. That is, the transponder 20 is preferably disposed in a region S1 illustrated in FIG. 2. The transponder 20 disposed in the region S1 is positioned in a region where the stress amplitude during travel is small, and this can effectively improve the durability of the transponder 20, and does not degrade the durability of the tire. Here, the transponder 20 disposed on the inner side in the tire radial direction of the position P1 is too close to a metal member such as the bead core 5, and this tends to degrade the communication performance of the transponder 20. On the other hand, the transponder 20 disposed on the outer side in the tire radial direction of the position P2 is positioned in a region where the stress amplitude during travel is large, and damage to the transponder 20 itself and interfacial failure in a periphery of the transponder 20 are likely to occur, and this is not preferable.

Figure 3:
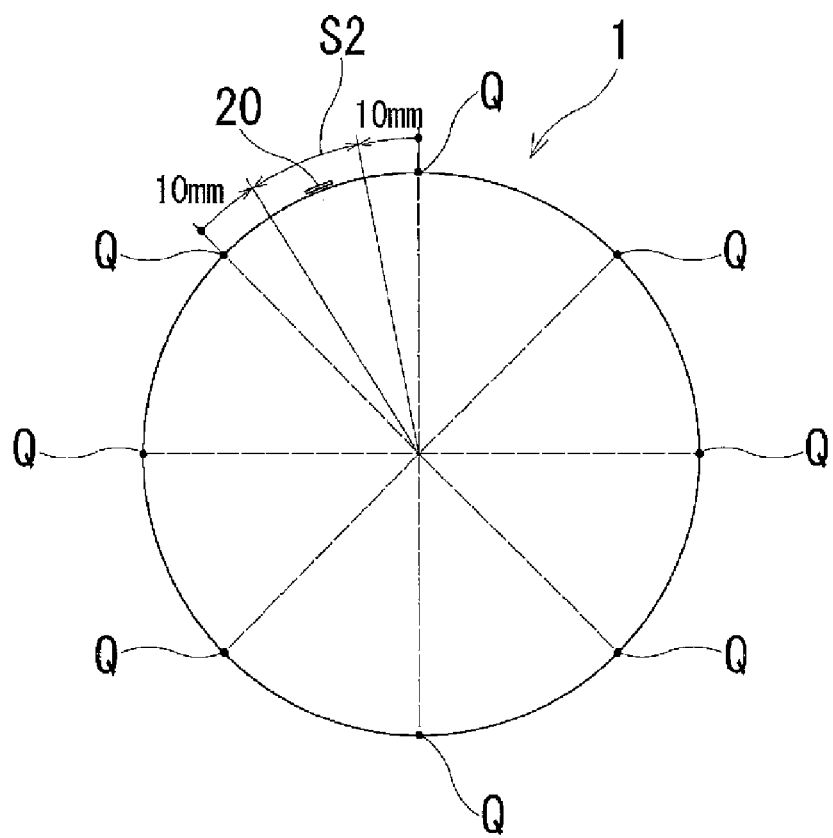
FIG. 3 is an equatorial cross-sectional view schematically illustrating the pneumatic tire of FIG. 1.

As illustrated in FIG. 3, a plurality of splice portions formed by overlaying end portions of tire components are on a tire circumference. FIG. 3 illustrates positions Q in the tire circumferential direction of the splice portions. The center of the transponder 20 is preferably disposed 10 mm or more away in the tire circumferential direction away from the splice portion of the tire component. That is, the transponder 20 is preferably disposed in a region S2 illustrated in FIG. 3. Specifically, the IC substrate 21 forming the transponder 20 is preferably located 10 mm or more away in the tire circumferential direction from the position Q. More preferably, all of the transponder 20 including the antenna 22 is located 10 mm or more away in the tire circumferential direction from the position Q, and most preferably, all of the transponder 20 covered with a covering rubber is located 10 mm or more away in the tire circumferential direction from the position Q. Also, the tire component disposed away from the transponder 20 is preferably the sidewall rubber layer 12, the rim cushion rubber layer 13, or the carcass layer 4, which is disposed adjacent to the transponder 20. By thus disposing the transponder 20 away from the splice portion of the tire component, the durability of the tire can be effectively improved.

Note that while the embodiment of FIG. 3 illustrates an example in which the positions Q in the tire circumferential direction of the splice portions of the tire components are disposed at equal intervals, no such limitation is intended. The positions Q in the tire circumferential direction can be set anywhere, and in either case, the transponder 20 is disposed 10 mm or more away in the tire circumferential direction from the splice portions of the tire components.

As illustrated in FIG. 4, a distance d between the cross-sectional center of the transponder 20 and the tire surface is preferably 1 mm or more. By thus spacing the transponder 20 and the tire surface apart from each other, the durability of the tire can be effectively improved, and the scratch resistance of the tire can be improved. In the embodiment of FIG. 4, the distance d is the distance between the cross-sectional center of the transponder 20 and the tire outer surface, whereas in a case where the transponder 20 is disposed in a position close to the innerliner layer 9, the distance d is the distance between the cross-sectional center of the transponder 20 and the tire inner surface. In particular, the distance d between the cross-sectional center of the transponder 20 and the tire outer surface is preferably 2 mm or more.

While the embodiment described above illustrates an example in which the end 4e of the turned up portion 4B of the carcass layer 4 is disposed at or near an upper end 6e of the bead filler 6, no such limitation is intended, and the end 4e of the turned up portion 4B of the carcass layer 4 can be disposed at any height.

Next, a configuration according to a second embodiment will be described. A pneumatic tire according to the second embodiment has a tire structure as illustrated in FIGS. 1 to 5B, as in the first embodiment.

In the pneumatic tire thus configured, the modulus M50 (0° C.) at 50% deformation at 0° C. of the covering layer 23 covering the transponder 20 is set in the range of from 0.5 MPa to 2.0 MPa. In particular, the modulus M50 (0° C.) at 50% deformation at 0° C. of the covering layer 23 is preferably in the range of from 0.6 MPa to 1.3 MPa. Also, the modulus M50 (−20° C.) at 50% deformation at −20° C. of the covering layer 23 and the modulus M50 (0° C.) at 50% deformation at 0° C. thereof satisfy the relationship 1.0<M50 (−20° C.)/M50 (0° C.)≤2.5. In particular, the relationship 1.1≤M50 (−20° C.)/M50 (0° C.)≤2.0 is preferably satisfied.

In the pneumatic tire described above, the transponder 20 is covered with the covering layer 23 and the modulus M50 (0° C.) at 50% deformation at 0° C. of the covering layer 23 is set in the range described above. Thus, the covering layer 23 can exert a sufficient protective effect on the transponder 20 while avoiding stress concentration at or near the edge of the covering layer 23 during a rise in tire temperature in a low-temperature environment. This can improve the durability of the transponder 20 while ensuring the durability of the tire.

Here, in a case where the modulus M50 (0° C.) at 50% deformation at 0° C. of the covering layer 23 is lower than the lower limit value, the protective effect thereof on the transponder 20 degrades, and the transponder 20 is likely to be damaged. Conversely, in a case where the modulus M50 (0° C.) at 50% deformation at 0° C. of the covering layer 23 is higher than the upper limit value, stress concentration is generated at or near the edge of the covering layer 23 during tire deformation, and peeling is likely to occur at an interface between the covering layer 23 and a rubber member adjacent to the covering layer 23.

Also, in the pneumatic tire described above, the modulus M50 (−20° C.) at 50% deformation at −20° C. of the covering layer 23 and the modulus M50 (0° C.) at 50% deformation at 0° C. of the covering layer 23 satisfy the relationship described above. Thus, the covering layer 23 can exert a sufficient protective effect on the transponder 20 at high temperature while avoiding stress concentration at or near the edge of the covering layer 23 during a rise in tire temperature in a low-temperature environment. This can improve the durability of the transponder 20 while ensuring the durability of the tire.

Here, in a case where the value of M50 (−20° C.)/M50 (0° C.) of the covering layer 23 is lower than the lower limit value and the temperature dependency of the modulus of the covering layer 23 in a low temperature range is too small, stress concentration is generated at or near the edge of the covering layer 23 with a rise in tire temperature during travel in a low-temperature environment, and peeling is likely to occur at the interface between the covering layer 23 and the rubber member adjacent to the covering layer 23, and the durability of the tire decreases. Conversely, in a case where the value of M50 (−20° C.)/M50 (0° C.) of the covering layer 23 is higher than the upper limit value and the temperature dependency of the modulus of the covering layer 23 in the low temperature range is too large, the covering layer 23 softens with a rise in tire temperature during travel in a low-temperature environment, and its protective effect on the transponder 20 degrades.

In the pneumatic tire described above, the storage modulus E'c (−20° C.) at −20° C. of the covering layer 23 is preferably in the range of from 3 MPa to 17 MPa. By thus setting the physical properties of the covering layer 23, the durability of the transponder 20 can be effectively improved in a low-temperature environment.

Here, in a case where the storage modulus E'c (−20° C.) at −20° C. of the covering layer 23 is lower than the lower limit value, the rigidity of the covering layer 23 decreases, and the protective effect thereof degrades. Conversely, in a case where the storage modulus E'c (−20° C.) at −20° C. of the covering layer 23 is higher than the upper limit value, the rigidity of the covering layer 23 increases, the covering layer 23 becomes brittle, and the covering layer 23 becomes prone to breakage, and thus the transponder 20 is likely to be damaged.

The storage modulus E'c (−20° C.) at −20° C. of the covering layer 23 and the storage modulus E'c (0° C.) at 0° C. of the covering layer 23 preferably satisfy the relationship 1.0≤E'c (−20° C.)/E'c (0° C.)≤1.5. By thus setting the physical properties of the covering layer 23, the temperature dependency of the covering layer 23 decreases (the covering layer 23 is less likely to generate heat), and this prevents the covering layer 23 from softening even with a rise in tire temperature during high-speed travel, effectively improving the durability of the transponder 20.

In the pneumatic tire described above, of the rubber members located on the outer side in the tire width direction of the transponder 20 (the sidewall rubber layer 12 and the rim cushion rubber layer 13 in FIG. 1), the rubber member having the largest storage modulus E'out (20° C.) at 20° C. (hereinafter sometimes referred to as an external member) corresponds to the rim cushion rubber layer 13. Note that the rubber member (external member) having the largest storage modulus at 20° C. does not include the covering layer 23 covering the transponder 20.

Furthermore, in a structure in which the transponder 20 is embedded on the outer side in the tire width direction of the carcass layer 4, the storage modulus E'out (−20° C.) at −20° C. of the external member and the storage modulus E'c (−20° C.) at −20° C. of the covering layer 23 preferably satisfy the relationship 0.1≤E'c (−20° C.)/E'out (−20° C.)≤1.5. In particular, the relationship 0.15≤E'c (−20° C.)/E'out (−20° C.)≤1.30 is preferably satisfied. This can effectively improve the durability of the transponder 20 while ensuring the durability of the tire in a low-temperature environment.

Here, in a case where the value of E'c (−20° C.)/E'out (−20° C.) is smaller than the lower limit value, the rigidity of the covering layer 23 decreases, and the protective effect thereof decreases. Conversely, in a case where the value of E'c (−20° C.)/E'out (−20° C.) is larger than the upper limit value, the rigidity of the covering layer 23 increases, the covering layer 23 becomes brittle, the covering layer 23 becomes prone to breakage, and thus the transponder 20 is likely to be damaged.

Next, a configuration according to a third embodiment will be described. A pneumatic tire according to the third embodiment has a tire structure as illustrated in FIGS. 1 to 5B, as in the first embodiment.

In the pneumatic tire thus configured, the modulus M50 (20° C.) at 50% deformation at 20° C. of the covering layer 23 covering the transponder 20 is set in the range of from 0.4 MPa to 1.5 MPa. In particular, the modulus M50 (20° C.) at 50% deformation at 20° C. of the covering layer 23 is preferably in the range of from 0.5 MPa to 1.2 MPa. Also, the modulus M50 (20° C.) at 50% deformation at 20° C. of the covering layer 23 and the modulus M50 (100° C.) at 50% deformation at 100° C. thereof satisfy the relationship 1.0<M50 (20° C.)/M50 (100° C.)≤2.5. In particular, the relationship 1.05≤M50 (20° C.)/M50 (100° C.)≤2.0 is preferably satisfied.

In the pneumatic tire described above, the transponder 20 is covered with the covering layer 23 and the modulus M50 (20° C.) at 50% deformation at 20° C. of the covering layer 23 is set in the range described above. Thus, the covering layer 23 can exert a sufficient protective effect on the transponder 20 while avoiding stress concentration at or near the edge of the covering layer 23. This can improve the durability of the transponder 20 while ensuring the durability of the tire.

Here, in a case where the modulus M50 (20° C.) at 50% deformation at 20° C. of the covering layer 23 is lower than the lower limit value, the protective effect thereof on the transponder 20 degrades, and the transponder 20 is likely to be damaged. Conversely, in a case where the modulus M50 (20° C.) at 50% deformation at 20° C. of the covering layer 23 is higher than the upper limit value, stress concentration is generated at or near the edge of the covering layer 23 during tire deformation, and peeling is likely to occur at an interface between the covering layer 23 and a rubber member adjacent to the covering layer 23.

Also, in the pneumatic tire described above, the modulus M50 (20° C.) at 50% deformation at 20° C. of the covering layer 23 and the modulus M50 (100° C.) at 50% deformation at 100° C. of the covering layer 23 satisfy the relationship described above. Thus, the covering layer 23 can exert a sufficient protective effect on the transponder 20 at high temperature while avoiding stress concentration at or near the edge of the covering layer 23 at high temperature. This can improve the durability of the transponder 20 while ensuring the durability of the tire.

Here, in a case where the value of M50 (20° C.)/M50 (100° C.) of the covering layer 23 is lower than the lower limit value and the temperature dependency of the modulus of the covering layer 23 in a normal to high temperature range is too small, stress concentration is generated at or near the edge of the covering layer 23 at high temperature, and peeling is likely to occur at the interface between the covering layer 23 and the rubber member adjacent to the covering layer 23, and the durability of the tire decreases. Conversely, in a case where the value of M50 (20° C.)/M50 (100° C.) of the covering layer 23 is higher than the upper limit value and the temperature dependency of the modulus of the covering layer 23 in a normal to high temperature range is too large, the covering layer 23 softens at high temperature, and its protective effect on the transponder 20 degrades.

In the pneumatic tire described above, the storage modulus E'c (20° C.) at 20° C. of the covering layer 23 is preferably in a range of from 2 MPa to 12 MPa. By thus setting the physical properties of the covering layer 23, the durability of the transponder 20 can be effectively improved.

Here, in a case where the storage modulus E'c (20° C.) at 20° C. of the covering layer 23 is lower than the lower limit value, the rigidity of the covering layer 23 decreases, and the protective effect thereof degrades. Conversely, in a case where the storage modulus E'c (20° C.) at 20° C. of the covering layer 23 is higher than the upper limit value, the rigidity of the covering layer 23 increases, the covering layer 23 becomes brittle, and the covering layer 23 becomes prone to breakage, and thus the transponder 20 is likely to be damaged.

The storage modulus E'c (20° C.) at 20° C. of the covering layer 23 and the storage modulus E'c (60° C.) at 60° C. of the covering layer 23 preferably satisfy the relationship 1.0≤E'c (20° C.)/E'c (60° C.)≤1.5. By thus setting the physical properties of the covering layer 23, the temperature dependency of the covering layer 23 decreases (the covering layer 23 is less likely to generate heat), and this prevents the covering layer 23 from softening even with a rise in tire temperature during high-speed travel, effectively improving the durability of the transponder 20.

In the pneumatic tire described above, of the rubber members located on the outer side in the tire width direction of the transponder 20 (the sidewall rubber layer 12 and the rim cushion rubber layer 13 in FIG. 1), the rubber member having the largest storage modulus E'out (20° C.) at 20° C. (hereinafter sometimes referred to as an external member) corresponds to the rim cushion rubber layer 13. Note that the rubber member (external member) having the largest storage modulus at 20° C. does not include the covering layer 23 covering the transponder 20.

Further, in a structure in which the transponder 20 is embedded on the outer side in the tire width direction of the carcass layer 4, the storage modulus E'out (20° C.) at 20° C. of the external member and the storage modulus E'c (20° C.) at 20° C. of the covering layer 23 preferably satisfy the relationship 0.1≤E'c (20° C.)/E'out (20° C.)≤1.5. In particular, the relationship 0.15≤E'c (20° C.)/E'out (20° C.)≤1.30 is preferably satisfied. This can effectively improve the durability of the transponder 20 while ensuring the durability of the tire.

Here, in a case where the value of E'c (20° C.)/E'out (20° C.) is smaller than the lower limit value, the rigidity of the covering layer 23 decreases, and the protective effect thereof degrades. Conversely, in a case where the value of E'c (20°

C.)/E'out (20° C.) is larger than the upper limit value, the rigidity of the covering layer 23 increases, the covering layer 23 becomes brittle, and the covering layer 23 becomes prone to breakage, and thus the transponder 20 is likely to be damaged.

Note that in the pneumatic tire according to the second or third embodiments described above, the relative dielectric constant of the covering layer 23, the white filler contained in the covering layer 23, the position in the tire circumferential direction of the transponder 20, the position in the tire radial direction of the transponder 20, the distance d between the cross-sectional center of the transponder 20 and the tire surface, the thickness of the covering layer 23, and the structure of the transponder 20 can be selected as in the pneumatic tire according to the first embodiment.

EXAMPLES

Tires according to Comparative Examples 1 to 2 and Examples 1 to 11 were manufactured. The tires were each a pneumatic tire having a tire size of 265/40ZR20 and including: a tread portion extending in a tire circumferential direction and having an annular shape; a pair of sidewall portions disposed on both sides of the tread portion; and a pair of bead portions disposed on an inner side in a tire radial direction of the sidewall portions. A transponder was embedded on an outer side in the tire width direction of the carcass layer, the transponder being covered with a covering layer. The position in the tire radial direction of the transponder, the secant modulus of elasticity at 10% deformation at 20° C. of the covering layer, the storage modulus E'c (20° C.) of the covering layer, E'c (20° C.)/E'out (20° C.), the relative dielectric constant of the covering layer, and the thickness of the covering layer were set as in Table 1.

Comparative Examples 1 to 2 and Examples 1 to 11 used a transponder having a pillar-like shape, and set the distance in the tire circumferential direction from the center of the transponder to a splice portion of a tire component to 10 mm and the distance from the cross-sectional center of the transponder to a tire outer surface to 2 mm or more.

Figure 6:
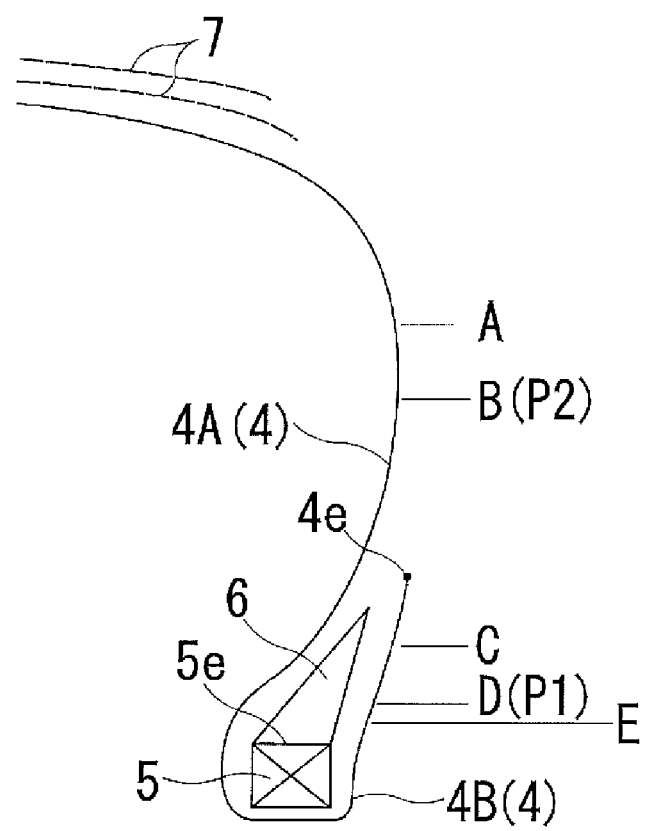
FIG. 6 is an explanatory diagram illustrating the position in a tire radial direction of a transponder in a test tire.

In Table 1, the position in the tire radial direction of the transponder corresponds to one of positions A to E illustrated in FIG. 6.

The test tires were subjected to tire evaluation (durability) and transponder evaluation (communication performance and durability) in accordance with a test method described below, and the results are indicated together in Table 1.

Durability (Tire and Transponder)

With each test tire mounted on a wheel of a standard rim, a travel test was performed using a drum testing machine at a temperature of 38° C., an air pressure of 120 kPa, 102% of the maximum load, and a travel speed of 81 km/h, and the distance traveled at the time of a tire failure was measured. Evaluation results are expressed as index values with Comparative Example 1 being assigned an index value of 100. Larger index values indicate superior tire durability. Further, each test tire was checked after the end of traveling for whether the transponder was communicable and whether the same was damaged. The results are indicated in three levels: "Excellent" in a case where the transponder was communicable and not damaged; "Good" in a case where the transponder was communicable but damaged; and "Poor" in a case where the transponder was not communicable.

Communication Performance (Transponder)

For each test tire, a communication operation with the transponder was performed using a reader/writer. Specifically, the maximum communication distance was measured with the reader/writer set at a power output of 250 mW and a carrier frequency of from 860 MHz to 960 MHz. Evaluation results are expressed as index values with Comparative Example 1 being assigned an index value of 100. Larger index values indicate superior communication performance.

TABLE 1

|  | Comparative Example 1 | Comparative Example 2 | Example 1 | Example 2 | Example 3 | Example 4 |
|---|---|---|---|---|---|---|
| Position in tire radial direction of transponder | C | C | C | C | C | E |
| Secant modulus of elasticity (20° C.) of covering layer (MPa) | 0.4 | 6.0 | 0.5 | 2.5 | 5.0 | 2.5 |
| Storage modulus E'c (20° C.) of covering layer (MPa) | 2.0 | 14.0 | 2.5 | 6.5 | 12.0 | 6.5 |
| E'c (20° C.)/E'out (20° C.) | 0.1 | 1.5 | 0.2 | 0.7 | 1.3 | 0.7 |
| Relative dielectric constant of covering layer | 8 | 8 | 8 | 8 | 8 | 8 |
| Thickness of covering layer (mm) | 0.2 | 0.2 | 0.2 | 0.2 | 0.2 | 0.2 |
| Tire evaluation — Durability | 100 | 90 | 100 | 102 | 100 | 102 |
| Transponder evaluation — Communication performance | 100 | 100 | 100 | 100 | 100 | 98 |
| Durability | Poor | Good | Good | Excellent | Good | Excellent |

|  | Example 5 | Example 6 | Example 7 | Example 8 | Example 9 | Example 10 | Example 11 |
|---|---|---|---|---|---|---|---|
| Position in tire radial direction of transponder | D | B | A | C | C | C | C |
| Secant modulus of elasticity (20° C.) of covering layer (MPa) | 2.5 | 2.5 | 2.5 | 2.5 | 2.5 | 2.5 | 2.5 |
| Storage modulus E'c (20° C.) of covering layer (MPa) | 6.5 | 6.5 | 6.5 | 6.5 | 6.5 | 6.5 | 6.5 |
| E'c (20° C.)/E'out (20° C.) | 0.7 | 0.7 | 0.7 | 0.7 | 0.7 | 0.7 | 0.7 |
| Relative dielectric constant of covering layer | 8 | 8 | 8 | 7 | 7 | 7 | 7 |

TABLE 1-continued

| | | | | | | | | |
|---|---|---|---|---|---|---|---|---|
| Thickness of covering layer (mm) | | 0.2 | 0.2 | 0.2 | 0.2 | 0.5 | 1.0 | 3.0 |
| Tire evaluation | Durability | 102 | 102 | 100 | 102 | 102 | 102 | 102 |
| Transponder evaluation | Communication performance | 100 | 100 | 100 | 102 | 103 | 105 | 107 |
| | Durability | Excellent | Excellent | Excellent | Excellent | Excellent | Excellent | Excellent |

As can be seen from Table 1 here, tire durability and transponder durability were improved in a well-balanced manner in the pneumatic tires of Examples 1 to 11, compared to Comparative Examples 1 and 2.

In Comparative Example 1, the secant modulus of elasticity at 10% deformation at 20° C. of the covering layer was too low, and thus the durability of the transponder was poor. In Comparative Example 2, the secant modulus of elasticity at 10% deformation at 20° C. of the covering layer was too high, and thus the durability of the tire was poor.

Next, tires according to Comparative Examples 21 to 24 and Examples 21 to 31 were manufactured. The tires were each a pneumatic tire having a tire size of 265/40ZR20 and including: a tread portion extending in the tire circumferential direction and having an annular shape; a pair of sidewall portions disposed on both sides of the tread portion; and a pair of bead portions disposed on the inner side in the tire radial direction of the sidewall portions. A transponder was embedded on the outer side in the tire width direction of the carcass layer, the transponder being covered with a covering layer. The position in the tire radial direction of the transponder, the modulus M50 (0° C.) at 50% deformation at 0° C. of the covering layer, M50 (−20° C.)/M50 (0° C.), the storage modulus E'c (−20° C.) of the covering layer, E'c (−20° C.)/E'out (−20° C.), the relative dielectric constant of the covering layer, and the thickness of the covering layer were set as in Table 2.

Comparative Examples 21 to 24 and Examples 21 to 31 used a transponder having a pillar-like shape, and set the distance in the tire circumferential direction from the center of the transponder to the splice portion of the tire component to 10 mm and the distance from the cross-sectional center of the transponder to the tire outer surface to 2 mm or more.

In Table 2, the position in the tire radial direction of the transponder corresponds to one of the positions A to E illustrated in FIG. 6.

The test tires were subjected to tire evaluation (durability) and transponder evaluation (communication performance and durability) in accordance with a test method described below, and the results are indicated together in Table 2.

Durability (Tire and Transponder)

With each test tire mounted on a wheel of a standard rim, a travel test was performed using a drum testing machine at a temperature of −20° C., an air pressure of 120 kPa, 102% of the maximum load, and a travel speed of 81 km/h, and the distance traveled at the time of a tire failure was measured. Evaluation results are expressed as index values with Comparative Example 21 being assigned an index value of 100. Larger index values indicate superior tire durability. Further, each test tire was checked after the end of traveling for whether the transponder was communicable and whether the same was damaged. The results are indicated in three levels: "Excellent" in a case where the transponder was communicable and not damaged; "Good" in a case where the transponder was communicable but damaged; and "Poor" in a case where the transponder was not communicable.

Communication Performance (Transponder)

For each test tire, a communication operation with the transponder was performed using a reader/writer. Specifically, the maximum communication distance was measured with the reader/writer set at a power output of 250 mW and a carrier frequency of from 860 MHz to 960 MHz. Evaluation results are expressed as index values with Comparative Example 21 being assigned an index value of 100. Larger index values indicate superior communication performance.

TABLE 2

| | | Comparative Example 21 | Comparative Example 22 | Comparative Example 23 | Comparative Example 24 | Example 21 |
|---|---|---|---|---|---|---|
| Position in tire radial direction of transponder | | C | C | C | C | C |
| Modulus M50 (0° C.) of covering layer | | 0.4 | 1.0 | 1.0 | 2.5 | 0.5 |
| M50 (−20° C.)/M50 (0° C.) | | 1.5 | 1.0 | 3.0 | 1.5 | 1.5 |
| Storage modulus E'c (−20° C.) of covering layer (MPa) | | 2 | 3.9 | 13.4 | 17 | 3 |
| E'c (−20° C.)/E'out (−20° C.) | | 0.1 | 0.25 | 0.9 | 1.1 | 0.2 |
| Relative dielectric constant of covering layer | | 8 | 8 | 8 | 8 | 8 |
| Thickness of covering layer (mm) | | 0.2 | 0.2 | 0.2 | 0.2 | 0.2 |
| Tire evaluation | Durability | 100 | 90 | 100 | 90 | 100 |
| Transponder evaluation | Communication performance | 100 | 100 | 100 | 100 | 100 |
| | Durability | Poor | Good | Poor | Good | Good |

TABLE 2-continued

|  |  | Example 27 | Example 28 | Example 29 | Example 30 | Example 31 |
|---|---|---|---|---|---|---|
| Position in tire radial direction of transponder |  | A | C | C | C | C |
| Modulus M50 (0° C.) of covering layer |  | 1.5 | 1.5 | 1.5 | 1.5 | 1.5 |
| M50 (−20° C.)/M50 (0° C.) |  | 1.5 | 1.5 | 1.5 | 1.5 | 1.5 |
| Storage modulus E'c (−20° C.) of covering layer (MPa) |  | 10.1 | 10.1 | 10.1 | 10.1 | 10.1 |
| E'c (−20° C.)/E'out (−20° C.) |  | 0.7 | 0.7 | 0.7 | 0.7 | 0.7 |
| Relative dielectric constant of covering layer |  | 8 | 7 | 7 | 7 | 7 |
| Thickness of covering layer (mm) |  | 0.2 | 0.2 | 0.5 | 1.0 | 3.0 |
| Tire evaluation | Durability | 100 | 102 | 102 | 102 | 102 |
| Transponder evaluation | Communication performance | 100 | 102 | 103 | 105 | 107 |
|  | Durability | Excellent | Excellent | Excellent | Excellent | Excellent |
|  |  | Example 27 | Example 28 | Example 29 | Example 30 | Example 31 |
| Position in tire radial direction of transponder |  | A | C | C | C | C |
| Modulus M50 (0° C.) of covering layer |  | 1.5 | 1.5 | 1.5 | 1.5 | 1.5 |
| M50 (−20° C.)/M50 (0° C.) |  | 1.5 | 1.5 | 1.5 | 1.5 | 1.5 |
| Storage modulus E'c (−20° C.) of covering layer (MPa) |  | 10.1 | 10.1 | 10.1 | 10.1 | 10.1 |
| E'c (−20° C.)/E'out (−20° C.) |  | 0.7 | 0.7 | 0.7 | 0.7 | 0.7 |
| Relative dielectric constant of covering layer |  | 8 | 7 | 7 | 7 | 7 |
| Thickness of covering layer (mm) |  | 0.2 | 0.2 | 0.5 | 1.0 | 3.0 |
| Tire evaluation | Durability | 100 | 102 | 102 | 102 | 102 |
| Transponder evaluation | Communication performance | 100 | 102 | 103 | 105 | 107 |
|  | Durability | Excellent | Excellent | Excellent | Excellent | Excellent |

As can be seen from Table 2 here, tire durability and transponder durability were improved in a well-balanced manner in the pneumatic tires of Examples 21 to 31, compared to Comparative Examples 21 to 24.

In Comparative Example 21, the modulus M50 (0° C.) at 50% deformation at 0° C. of the covering layer was too low, and thus the durability of the transponder was poor. In Comparative Example 22, the value of M50 (−20° C.)/M50 (0° C.) of the covering layer was too low, and thus the durability of the tire was poor. In Comparative Example 23, the value of M50 (−20° C.)/M50 (0° C.) of the covering layer was too high, and thus the durability of the transponder was poor. In Comparative Example 24, the modulus M50 (0° C.) at 50% deformation at 0° C. of the covering layer was too high, and thus the durability of the tire was poor.

Next, tires according to Comparative Examples 41 to 44 and Examples 41 to 51 were manufactured. The tires were each a pneumatic tire having a tire size of 265/40ZR20 and including: a tread portion extending in the tire circumferential direction and having an annular shape; a pair of sidewall portions disposed on both sides of the tread portion; and a pair of bead portions disposed on the inner side in the tire radial direction of the sidewall portions. A transponder was embedded on the outer side in the tire width direction of the carcass layer, the transponder being covered with a covering layer. The position in the tire radial direction of the transponder, the modulus M50 (20° C.) at 50% deformation at 20° C. of the covering layer, M50 (20° C.)/M50 (100° C.), the storage modulus E'c (20° C.) of the covering layer, E'c (20° C.)/E'out (20° C.), the relative dielectric constant of the covering layer, and the thickness of the covering layer were set as in Table 3.

Comparative Examples 41 to 44 and Examples 41 to 51 used a transponder having a pillar-like shape, and set the distance in the tire circumferential direction from the center of the transponder to the splice portion of the tire component to 10 mm and the distance from the cross-sectional center of the transponder to the tire outer surface to 2 mm or more.

In Table 3, the position in the tire radial direction of the transponder corresponds to one of the positions A to E illustrated in FIG. 6.

The test tires were subjected to tire evaluation (durability) and transponder evaluation (communication performance and durability) in accordance with a test method described below, and the results are indicated together in Table 3.

Durability (Tire and Transponder)

With each test tire mounted on a wheel of a standard rim, a travel test was performed using a drum testing machine at a temperature of 38° C., an air pressure of 120 kPa, 102% of the maximum load, and a travel speed of 81 km/h, and the distance traveled at the time of a tire failure was measured. Evaluation results are expressed as index values with Com parative Example 41 being assigned an index value of 100. Larger index values indicate superior tire durability. Further, each test tire was checked after the end of traveling for whether the transponder was communicable and whether the same was damaged. The results are indicated in three levels: "Excellent" in a case where the transponder was communicable and not damaged; "Good" in a case where the transponder was communicable but damaged; and "Poor" in a case where the transponder was not communicable.

Communication Performance (Transponder):

For each test tire, a communication operation with the transponder was performed using a reader/writer. Specifically, the maximum communication distance was measured with the reader/writer set at a power output of 250 mW and a carrier frequency of from 860 MHz to 960 MHz. Evaluation results are expressed as index values with Comparative Example 41 being assigned an index value of 100. Larger index values indicate superior communication performance.

TABLE 3

|  |  | Comparative Example 41 | Comparative Example 42 | Comparative Example 43 | Comparative Example 44 | Example 41 |
|---|---|---|---|---|---|---|
| Position in tire radial direction of transponder |  | C | C | C | C | C |
| Modulus M50 (20° C.) of covering layer |  | 0.3 | 1.0 | 1.0 | 2.0 | 0.4 |
| M50 (20° C.)/M50 (100° C.) |  | 1.5 | 1.0 | 3.0 | 1.5 | 1.5 |
| Storage modulus E'c (20° C.) of covering layer (MPa) |  | 2.0 | 7.0 | 7.0 | 14.0 | 2.0 |
| E'c (20° C.)/E'out (20° C.) |  | 0.1 | 0.7 | 0.7 | 1.6 | 0.1 |
| Relative dielectric constant of covering layer |  | 8 | 8 | 8 | 8 | 8 |
| Thickness of covering layer (mm) |  | 0.2 | 0.2 | 0.2 | 0.2 | 0.2 |
| Tire evaluation | Durability | 100 | 90 | 100 | 90 | 100 |
| Transponder evaluation | Communication performance | 100 | 100 | 100 | 100 | 100 |
|  | Durability | Poor | Good | Poor | Good | Good |
|  |  | Example 42 | Example 43 | Example 44 | Example 45 | Example 46 |
| Position in tire radial direction of transponder |  | C | C | E | D | B |
| Modulus M50 (20° C.) of covering layer |  | 1.0 | 1.0 | 1.0 | 1.0 | 1.0 |
| M50 (20° C.)/M50 (100° C.) |  | 1.5 | 2.5 | 1.5 | 1.5 | 1.5 |
| Storage modulus E'c (20° C.) of covering layer (MPa) |  | 7.0 | 7.0 | 7.0 | 7.0 | 7.0 |
| E'c (20° C.)/E'out (20° C.) |  | 0.7 | 0.7 | 0.7 | 0.7 | 0.7 |
| Relative dielectric constant of covering layer |  | 8 | 8 | 8 | 8 | 8 |
| Thickness of covering layer (mm) |  | 0.2 | 0.2 | 0.2 | 0.2 | 0.2 |
| Tire evaluation | Durability | 102 | 102 | 102 | 102 | 102 |
| Transponder evaluation | Communication performance | 100 | 100 | 98 | 100 | 100 |
|  | Durability | Excellent | Good | Excellent | Excellent | Excellent |
|  |  | Example 47 | Example 48 | Example 49 | Example 50 | Example 51 |
| Position in tire radial direction of transponder |  | A | C | C | C | C |
| Modulus M50 (20° C.) of covering layer |  | 1.0 | 1.0 | 1.0 | 1.0 | 1.0 |
| M50 (20° C.)/M50 (100° C.) |  | 1.5 | 1.5 | 1.5 | 1.5 | 1.5 |
| Storage modulus E'c (20° C.) of covering layer (MPa) |  | 7.0 | 7.0 | 7.0 | 7.0 | 7.0 |
| E'c (20° C.)/E'out (20° C.) |  | 0.7 | 0.7 | 0.7 | 0.7 | 0.7 |
| Relative dielectric constant of covering layer |  | 8 | 7 | 7 | 7 | 7 |
| Thickness of covering layer (mm) |  | 0.2 | 0.2 | 0.5 | 1.0 | 3.0 |
| Tire evaluation | Durability | 100 | 102 | 102 | 102 | 102 |
| Transponder evaluation | Communication performance | 100 | 102 | 103 | 105 | 107 |
|  | Durability | Excellent | Excellent | Excellent | Excellent | Excellent |

As can be seen from Table 3 here, tire durability and transponder durability were improved in a well-balanced manner in the pneumatic tires of Examples 41 to 51, compared to Comparative Examples 41 to 44.

In Comparative Example 41, the modulus M50 (20° C.) at 50% deformation at 20° C. of the covering layer was too low, and thus the durability of the transponder was poor. In Comparative Example 42, the value of M50 (20° C.)/M50 (100° C.) of the covering layer was too low, and thus the durability of the tire was poor. In Comparative Example 43, the value of M50 (20° C.)/M50 (100° C.) of the covering layer was too high, and thus the durability of the transponder was poor. In Comparative Example 44, the modulus M50 (20° C.) at 50% deformation at 20° C. of the covering layer was too high, and thus the durability of the tire was poor.

The invention claimed is:

1. A pneumatic tire, comprising:
a tread portion extending in a tire circumferential direction and having an annular shape;
a pair of sidewall portions disposed on both sides of the tread portion; and
a pair of bead portions disposed on an inner side in a tire radial direction of the sidewall portions;
the tire being embedded with a transponder covered with a covering layer;
a modulus M50 (0° C.) at 50% deformation at 0° C. of the covering layer being in a range of from 0.5 MPa to 2.0 MPa; and
a modulus M50 (−20° C.) at 50% deformation at −20° C. of the covering layer and the modulus M50 (0° C.) at 50% deformation at 0° C. of the covering layer satisfying a relationship 1.0<M50 (−20° C.)/M50 (0° C.)≤2.5.

2. The pneumatic tire according to claim 1, wherein a storage modulus E'c (−20° C.) at −20° C. of the covering layer is in a range of from 3 MPa to 17 MPa.

3. The pneumatic tire according to claim 1, wherein
the transponder is embedded on an outer side in a tire width direction of a carcass layer, and
a storage modulus E'c (−20° C.) at −20° C. of the covering layer and a storage modulus E'out (−20° C.) at −20° C. of a rubber member having a largest storage modulus at 20° C. of rubber members located on the outer side in the tire width direction of the transponder satisfy a relationship 0.1≤E'c (−20° C.)/E'out (−20° C.)≤1.5.

4. The pneumatic tire according to claim 1, wherein the covering layer has a relative dielectric constant of 7 or less.

5. The pneumatic tire according to claim 1, wherein the covering layer is formed of a rubber or an elastomer and 20 phr or more of a white filler.

6. The pneumatic tire according to claim 5, wherein the white filler comprises from 20 phr to 55 phr of calcium carbonate.

7. The pneumatic tire according to claim 1, wherein a center of the transponder is disposed 10 mm or more away in the tire circumferential direction from a splice portion of a tire component.

8. The pneumatic tire according to claim 1, wherein the transponder is disposed between a position 15 mm away from and on an outer side in the tire radial direction of an upper end of a bead core of the bead portion and a tire maximum width position.

9. The pneumatic tire according to claim 1, wherein a distance between a cross-sectional center of the transponder and a tire surface is 1 mm or more.

10. The pneumatic tire according to claim 1, wherein a thickness of the covering layer ranges from 0.5 mm to 3.0 mm.

11. The pneumatic tire according to claim 1, wherein
the transponder comprises an IC substrate that stores data and an antenna that transmits and receives data, and
the antenna has a helical shape.

* * * * *